April 22, 1930.                    W. B. JONES                     1,755,479
                    METHOD OF AND MEANS FOR CYCLIC CURRENT CONTROL
                        Filed April 28, 1924          4 Sheets-Sheet 1

Inventor:
W. Bartlett Jones,

April 22, 1930.  W. B. JONES  1,755,479
METHOD OF AND MEANS FOR CYCLIC CURRENT CONTROL
Filed April 28, 1924  4 Sheets-Sheet 2
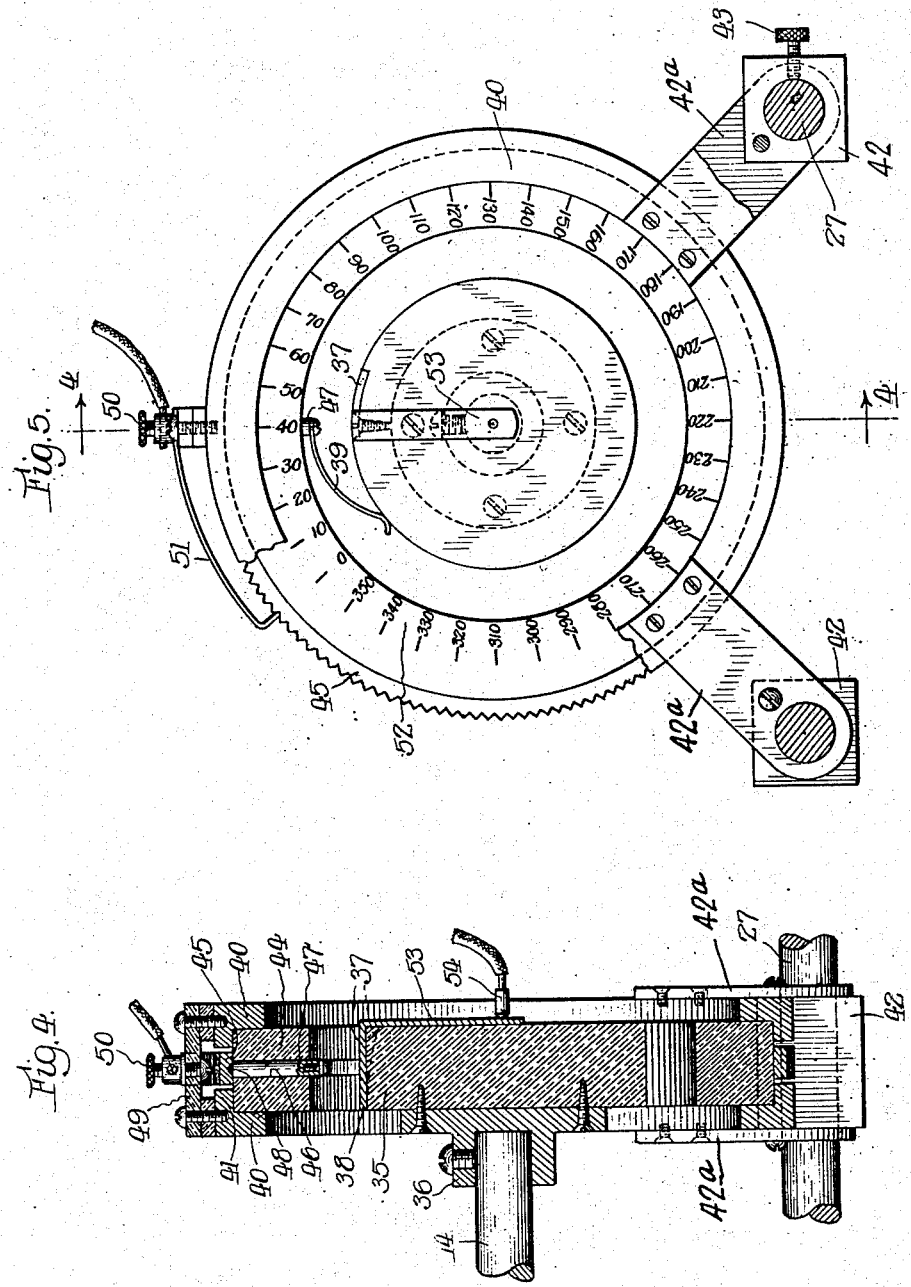
Inventor:
W. Bartlett Jones, April 22, 1930.   W. B. JONES   1,755,479
METHOD OF AND MEANS FOR CYCLIC CURRENT CONTROL
Filed April 28, 1924   4 Sheets-Sheet 3

Inventor:
W. Bartlett Jones,

Inventor:
W. Bartlett Jones

Patented Apr. 22, 1930

1,755,479

UNITED STATES PATENT OFFICE

W. BARTLETT JONES, OF CHICAGO, ILLINOIS

METHOD OF AND MEANS FOR CYCLIC CURRENT CONTROL

Application filed April 28, 1924. Serial No. 709,350.

This invention lies generally in the field of electrochemistry and relates particularly to a method of and means for applying and controlling electric currents.

The invention has special reference to electrolytic chemistry in aqueous solutions, but to one familiar with other electrochemical fields it is apparent that the principles herein set forth may in their broadest aspect be applicable to other special fields, such as electrolysis of fused salts, electric arcs, electric furnaces, and gaseous electrochemical conduction.

By way of illustration of its practical application the invention is herein set forth in considerable detail as it applies to the field of electrolytic chemistry.

Heretofore, electrolytic chemical reactions have been carried out commercially with continuously flowing currents in cells in which the two electrodes function one as a cathode and the other as an anode, there being substantially no change in the current flowing through each electrode. In such a case each electrode operates at a certain potential, that is, an electromotive force exists between the electrode and the solution in the cell. This electromotive force is hereinafter referred to as the "electrode potential". The latter is a different value from the so-called "single" electrode potential, which is that electromotive force which exists at equilibrium between a solution and an electrode immersed therein, when no current flows therebetween. Beginning with the last mentioned state, the potential of the electrode changes when a continuous current flows therethrough and seeks to approach an equilibrium condition known as the "polarizing potential", the value of which depends upon many factors, including the character of the solution, the material of the electrode, the current density, temperature and still others.

It is usually an incident to ordinary electrolytic reactions that the electrode operates at this polarizing potential. In the case of reduction (or oxidation) the reducing (or oxidizing) action is more powerful, the higher the polarization potential. In practice, however, the commercially practical electrode materials, as for example lead, give a high polarization potential. This fact limits the field of usefulness of such materials to those reactions which require a high potential, thereby eliminating that class of reactions requiring lower potentials. The latter class may, however, be carried out by using certain electrodes giving lower potentials, as for instance, platinum, but in general many such fields cannot be exploited commercially. Investigators have long sought for some way to overcome these objections, so as to make the commercially practical electrode materials available for the lower potential reactions.

It is an object of this invention to control the electrode current so as to prevent the continued existence of the high polarizing potential of an electrode.

Another object of this invention is to provide for the flowing of the current in a rapid succession of repeating cycles during which a rise and fall of electrode potential may take place.

Another object of the invention is to provide regulating means so that the periods of rise and fall may be relatively changed within the cycle.

Another object of the invention is to provide for hastening or delaying the rise or fall of the potential.

Still another object is to provide for reversing the current through the electrode for a required period of time without necessarily changing the cathodic (or anodic) character of the electrode.

Still another object is to provide a system which enables the operator to determine the prevailing conditions in order to regulate the current in the various parts of the cycle.

Still other objects and advantages of my invention will be apparent from the following description of one method of determining, for the purpose of control, the course of events taking place within the cycle.

The principle upon which my invention is effective in the present instance is that each electrode, after the flow of current therethrough, to or from a solution, temporarily stores a portion of energy, electrochemically after the removal of the impressed voltage, just as the plates of a common storage battery function. But the capacity for storage is usually limited and likewise the stability of the storage condition. The nature, degree and extent of these storage limitations are determined by many factors and are at the most somewhat obscure even to the well informed. The common lead storage cell is an example of high capacity for storage and also of great stability. The storage effect may be rapidly destroyed in a short time in several ways: (1) by depolarizing substances in the solution, (2) by self-decomposition, and (3) by other physical or chemical action, or by any combination of these, the phenomenon being extremely complex and variable according to the specific conditions. It is possible also to hasten the destruction of the stored energy by sending a reverse current through the electrode. But in the last instance, when the stored energy has been removed the electrode will change its character either from cathode to anode or from anode to cathode, as the case may be, such change hereinafter being referred to as a change in functional character.

In order to explain as clearly as possible the nature of my invention, I have chosen to illustrate two applications thereof, one involving direct current alone and the other involving both alternating and direct current. In the accompanying drawings I have shown electrical connections, apparatus, and some result curves which will be referred to hereinafter more in detail to illustrate the invention. In the drawings:

Fig. 4 shows a cross-section of a contact device, being a cross-section on the line 4—4 of Fig. 5.

Fig. 5 is an elevation of the contact device.

Figure 1:
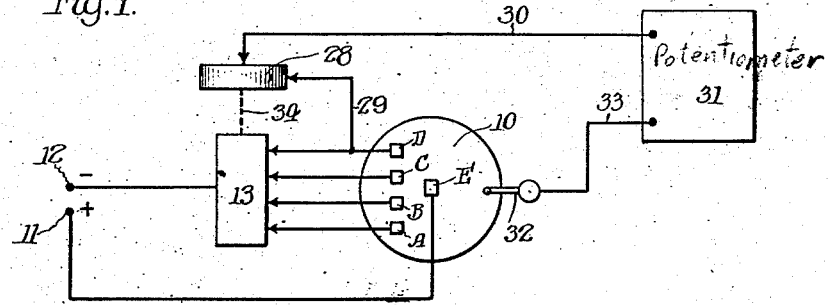
Figure 1 illustrates diagrammatically an electrical arrangement for intermittent current impulses through an electrolytic cell.

Referring to Fig. 1, I show an electrolytic cell 10 equipped with five electrodes, A, B, C, D and E, the last mentioned being connected as anode to the positive side 11 of a direct current source. The negative side 12 is connected to each of the other electrodes as cathodes through an interrupting device 13. This device is arranged to make and break each cathode circuit to produce therein a working period and an idle period following each other in rapid succession, the arrangement further being such that the current flows through at least one circuit in order to prevent a complete cut-off of the current through the cell. The purpose of this last mentioned arrangement is to constitute the electrodes A, B, C, and D, in combination with the interrupting device 13, as an electrode system, permitting a continued flow of current therethrough regardless of the intermittent flow in the separate electrodes. By this arrangement the anode may function continuously as such while each cathode functions intermittently as such. The device 13 is arranged to adjust the relative time periods of the active and idle portions of the cycle both within the cycle for any one electrode and with reference to the cycles for the other electrodes.

Figure 2:
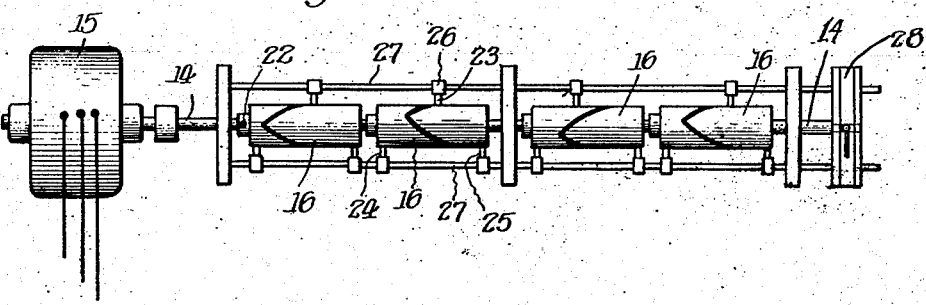
Fig. 2 shows in detail an apparatus for producing the current impulses.
Figure 3:
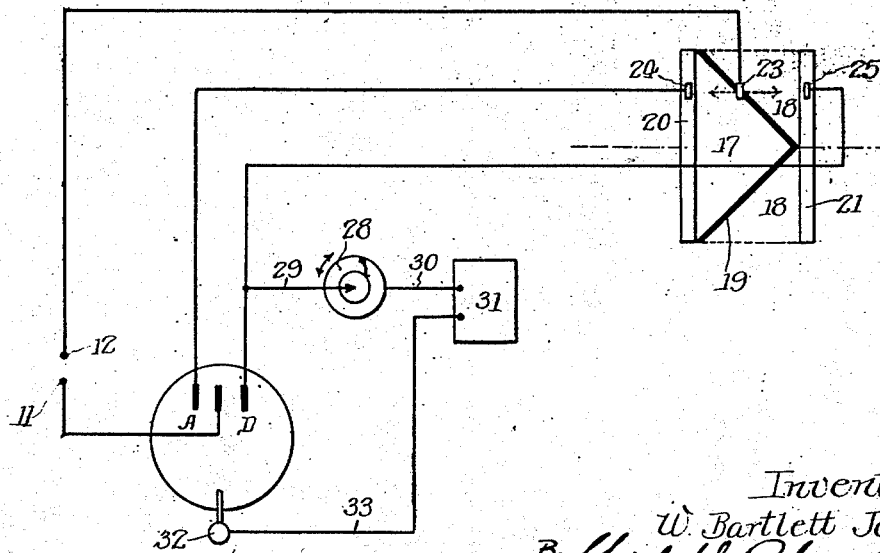
Fig. 3 is a diagram showing the arrangement of Fig. 1 and the apparatus of Fig. 2 in operating relationship.

In Fig. 2 is shown a device which accomplishes the functions of the device 13. This consists of a rotary shaft 14 driven by a variable speed motor 15. Upon the shaft are mounted cylinders 16 having fractional portions of their surfaces adapted for contact electrically with a suitable brush. One such cylinder may be provided for as many electrodes A, B, C, and D as are used in connection therewith. In Fig. 3 there is represented a developed surface of one such cylinder comprising two separate triangular forms 17 and 18 wrapped around the cylinder and insulated from each other at 19. Contact rings 20 and 21 are constructed adjacent or integral therewith for securing continued electrical contact to the portions 17 and 18 as the latter are rotated. By rotating such a cylinder a brush in contact therewith creates a closed circuit for any desired portion of one revolution according to the adjustment of the brush along the cylinder axially of the shaft 14. Each cylinder is rotatably adjustable on the shaft 14 by suitable means as the screw 22 in order to adjust the relative instants of make and break.

I choose to illustrate the application of this type of cylinder (Fig. 3) in connection with the arrangement of Fig. 1, using only two cathodes A and D. For this purpose one cylinder will suffice. A brush 23 is shown of any sufficient size to contact both sides 17 and 18 of the cylinder 16 across the insulating space 19 therebetween. Likewise two other brushes 24 and 25 are shown for the contact rings 20 and 21. Suitable brush holders 26 for the various brushes are mounted slidably on rods 27 which are arranged parallel to the shaft 14. By adjusting the position of the brush 23 axially along the cylinder the ratio of the active and the idle periods of any one electrode, say electrode D, may be varied at will. By varying the speed of the motor the time of such periods may be varied at will. Thus any predetermined period for all electrodes may be obtained by a proper choice and adjustment of cylinders and number of electrodes.

The results obtained by using such an apparatus may be determined, say for the electrode D, by a measurement of the electrode potential. To illustrate the relation of the apparatus above described to the electrode potential, and the storage effect above alluded to, some measuring device must be employed in connection therewith.

It is the custom in the art to measure the electrode potentials by the compensation method of Poggendorf. This consists of opposing the potential of the electrode to be measured by an equal potential the value of which can be readily varied and ascertained. This results in measuring voltage or electrical pressure without drawing energy therefrom, whereby to weaken or destroy the value being measured. As in the present instance the stored energy is the primary consideration it is therefore necessary to use some such method which is not destructive of the value being determined. Heretofore, in the art the potentials to be measured have been practically constant so that the application of the Poggendorf method has had no disadvantages. The use of a series of repeating cycles involving active and idle periods for the electrode results in a discontinuous value, repeating under equilibrium conditions. Therefore, a means has been devised to obtain nearly instantaneous values by contact to the electrode at the same point in the successive cycles, thereby furnishing a constant value at periodic intervals which can be measured by suitable sensitive means much as any continuous value would be measured. Furthermore, means is provided to move the contact point to any part of the cycle.

This contact device is illustrated diagrammatically by numeral 28 in Figs. 1 and 3 in connection with electrode D. A wire 29 is connected to electrode D and the device 28. A second wire 30 leads from the device to a potentiometer 31 embodying the Poggendorf system, or to any other suitable and sensitive device for the purpose. A standard reference electrode 32 having a known potential between its metallic portion and the solution constituting it in part, as the calomel or hydrogen electrode, is immersed in the cell 10 and a wire 33 leads from the reference electrode to the potentiometer. Thus the wires 30 and 33 contain in circuit therewith the electrode D and the solution, the potential between which it is desired to measure. The contact device 28 is arranged to close the circuit therethrough nearly instantaneously once per cycle and is hence associated with the cycle producer. It is represented in connection therewith by the line 34 in Fig. 1, and is shown mounted on the shaft 14 in Fig. 2.

The contact device 28 is designed to be adjusted for moving the contact point in the cycle to any part thereof. Figs. 4 and 5 represent a suitable device for this purpose. A fiber disk 35 is rigidly mounted on a shaft as 14 of the contact device, by the axial socket mounting 36. The disk has in its periphery a metallic insert 37 which includes a variable portion of the circumference of the disk by virtue of its triangular form, much as the cylinder 16 is constructed. By contacting the tip 38 of such insert, an instantaneous value may be measured. But the ordinary apparatus is not capable of doing this, so a more prolonged contact is made. I have found that 10° of the circumference is sufficient to obtain distinctly measurable values with ordinary available potentiometer systems. A brush 39 in the form of a spring wire contact is adjustably mounted with reference to the disk 35 for adjustment axially along the insert and adjustable radially about the rotating disk to vary the position of contact in the cycle. Two annular side brackets 40 with retaining flanges 41 are rigidly held to blocks 42 by the strips 42$^a$ secured to the brackets 40 and to the blocks 42 which are slidable along the fixed rods 27 parallel to the shaft 14. A screw 43 holds either block in adjusted position, which position determines the arc of contact made at each revolution. Between the brackets is a fiber ring 44 held concentrically with the axis of rotation of the shaft 14. The ring 44 is easily rotatable within the brackets 40. A metallic ring 45 is mounted rigidly on the fiber ring and has its circumference notched into subdivisions of 360°. A square hole 46 is provided through the fiber ring for a square plug 47 carrying the spring brush 39. The plug has its tip 48 pointed to make electrical contact with the ring 45. An insulating strip 49 spans the two brackets 40 and carries a binding post 50 and a spring detent finger 51 which engages the notches in the ring 45. The ring has a suitable dial 52 inscribed thereon to determine a recordable position for the ring as the point of contact in the cycle. The contact device serves to make and break a circuit. One connection to the device is made through the post 50 while the other is made to the insert 37 through a radial extension 53 thereof on the face of the disk. A carbon brush 54 contacts the extension at the center of rotation.

Figure 6:
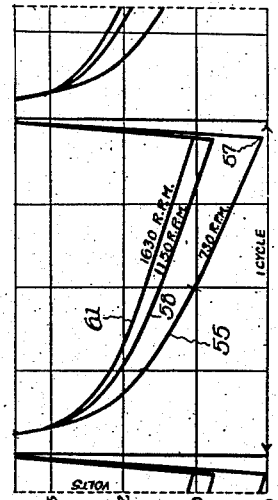
Figs. 6 and 7 represent electrode potentials measured during intermittent periods when no current flows.
Figure 7:
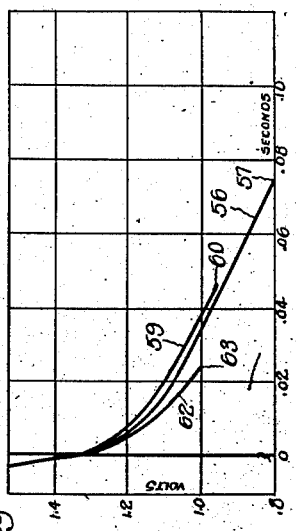

The operation of the above described apparatus is as follows: Referring to Figs. 2, 3, 6 and 7 the brush 23 has been set so that the electrode D has 12% of the cycle active and 88% of the cycle idle. During the active period let a relatively high current flow through the electrode at a density of 0.75 amperes per square inch of area. Fig. 6 horizontally represents time in cycle units, and represents vertically volts determined by the potentiometer 31. The parts of Fig. 6 incompleted at the top of the figure lie in the active period, concerning which there is at present no discussion as to measurements made. The motor 15 is rotated at 730 revolutions per minute giving an active period for the electrode of about 0.01 seconds. At the end of that period the current is cut off by the device 13 and measurement of potential taken by device 28 with the brush 39 placed in various positions in the idle part of the cycle. With a 10° arc of contact for brush 39 and 730 revolutions per minute, an impulse lasting for 0.0023 seconds is received every 0.082 seconds. Curve 55 in Fig. 6 represents the measured potential using a normal calomel electrode as the reference electrode 32. The curve shows a drop in the potential as the time is prolonged. Curve 56 of Fig. 7 is derived from the same data as curve 55 but is plotted to a time scale in seconds.

By increasing the speed of the motor 15 the current of the active period may be re-established before the potential has dropped so low as the point 57 in the curves 55 and 56. In Fig. 6 curve 58 indicates the result obtained with a motor speed of 1150 R. P. M. Curve 59 of Fig. 7 represents curve 58 drawn to a time scale in seconds. It is practically coincident with the curve 56 so far as it extends, being terminated at 60. It is clear then that by increasing the speed of the motor the idle period may be shortened and some of the energy stored during the active period be retained above a lower limit, predetermined in part by the time permitted for dissipation in the idle period. A further continued increase of speed is represented by curves 61 and 62 of Figs. 6 and 7 respectively terminating at 63 in the time scale. It is significant here that curve 62 is below the curves 56 and 59. By increasing the speed alone, the active period as well as the idle period is shortened, so that to permit the same extent of saturation of the storage capacity of the electrode the active period may be retained nearly constant by increasing the ratio of activity to idleness in the cycle in proportion to the increased speed. This is accomplished by moving brush 23 to the right in Fig. 3, thereby increasing the active-idle ratio for electrode D.

The energy stored in the electrode, and that discharged during the active period, is ordinarily utilized by having an absorbing agent therefor in the cell. Such substances are called depolarizers since their capacity to absorb the products set free by the passing of current tends to lower the potential of the electrode or, in other words, to depolarize it. Such a substance present during the idle period hastens the self-depolarization represented by the curves 55, 58 and 61.

Figure 8:
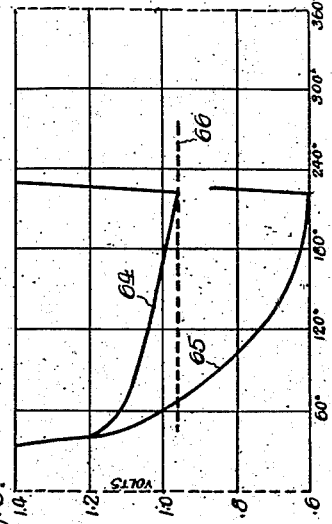
Fig. 8 represents comparative electrode potentials showing the decrease caused by the presence of a depolarizer.

In Fig. 8 is represented a change during the idle period of the dissipation curve caused by the addition of a slight amount of depolarizer. In this instance the idle period was 50% of the cycle and the time of the cycle was 0.053 sec. (about 1125 R. P. M.). Curve 64 represents conditions similar to curves 55, 58 and 61 with a lead cathode D in a normal sulphuric acid solution. Curve 65 represents the result obtained with the same setting and operation as used to secure curve 64 but with some oil of nitrobenzene added to form a saturated solution thereof for the purpose of securing a moderately appreciable absorption of hydrogen stored during the active period.

In Fig. 8 the line 66 indicates a lower limit of potential arbitrarily chosen for illustrative purposes. Some chemical reactions will not take place below this limit or perhaps an undesirable reaction so takes place below this limit. By applying the measuring means and the controlling means of this invention the current may be re-established at the proper instant to prevent the existence at the electrode of the lower limit at any time during the cycle. This is so shown with reference to curve 64.

Sufficient discussion has now been given to what takes place during the idle period. Likewise, it has been shown with what facility the potential may be measured during the idle period. This is because no current flows through the electrode to complicate the measurement. Generally speaking the amount of energy stored on the electrode is very small so that no considerable portion is available during the idle period. By passage of current the energy, or preferably stated, the products set free thereby, may be made available in proportion to the amount of current flowing. The effectiveness of the absorption of such products by a particular depolarizer is likewise dependent upon the potential at which discharge occurs. The time efficiency of a process of this sort depends upon the amount of electricity that can be passed through the cell in a given time. By using the alternate periods of activity and idleness periodically to lower the electrode potential, the time efficiency is impaired owing to the relatively long time required for self-depolarization of the electrode. By the description hereinafter set forth I have shown a practical manner of applying a reverse current in what has been above described as the idle period. The reverse current hastily removes the stored products of energy and thereby lessens the time otherwise required for that purpose in the preceding arrangement. But the application of a reverse current is attended with difficulties which have been obstacles to others in their blind application of a somewhat similar form of procedure. By employing the measuring means of this invention and controlling the currents as determined thereby for the desired objects many practical advantages result.

A reverse current is readily produced by superimposing an alternating current on a direct current such that the one-half of the alternating current reinforces the direct current and the other half opposes it. By suitably adjusting the ratios of direct current to alternating current the reverse current will be varied at will or even eliminated.

The combined use of alternating and direct current to produce an asymmetric, sinusoidal current has been used by others. Various electrical methods to produce the effect have been used. Generally the asymmetric current has been applied to the usual two-electrode cell so that both anode and cathode have partaken of the effects produced. This is usually an undesirable feature. Ordinarily, the effect is desired at but one electrode, either cathode or anode. Hereinafter I describe the use of an asymmetric current as applied to the cathode, but it is to be understood that the method is equally applicable to the anode.

Figure 9:
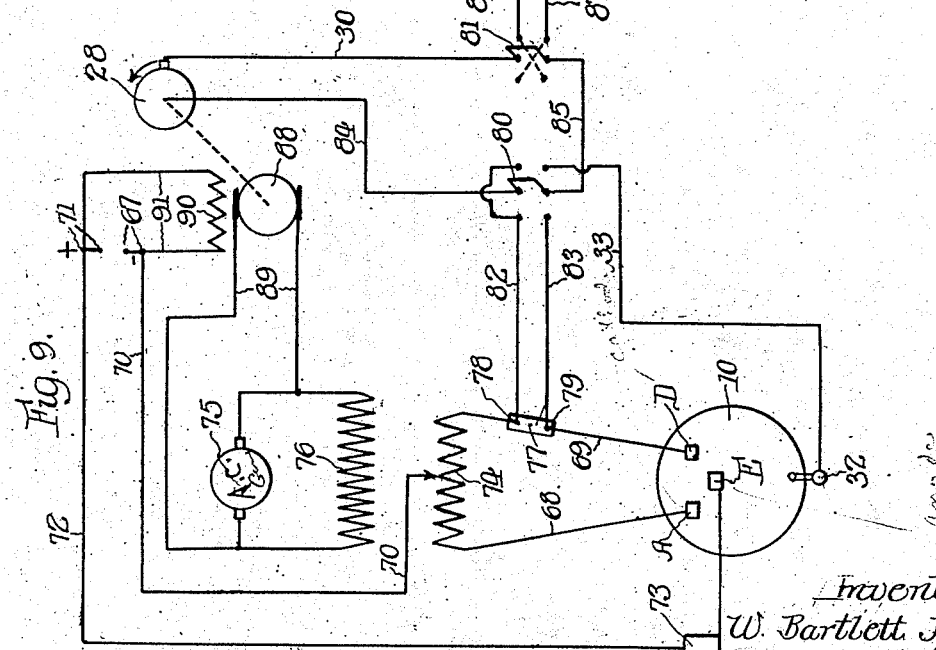
Fig. 9 is a diagrammatic view of an electrical scheme for superimposing in an electrode an alternating current on a direct current, and for determining the results produced.

Fig. 9 shows such a working electrical arrangement for the cell described and shown in Fig. 3 having electrode E as anode and the electrodes A and D as cathodes. Both cathodes are of similar construction and arranged in the cell to be equivalent to each other. For this purpose they are arranged in the cell in similar relation to the anode E. The two cathodes are connected to the negative pole 67 of a direct current source by the wires 68 and 69 joined to the wire 70. The anode E is connected to the positive pole 71 by the wire 72. A suitable resistance 73 is shown in the circuit as a means to regulate the direct current. By the arrangement so far described, with equal resistance in the two cathode circuits to the anode, equal half portions of the direct current flow through each cathode.

The two cathodes immersed in the cell 10 produce a closed circuit A—68—69—D—cell—A. By placing a suitable alternating current generator in this circuit, symmetrically arranged with respect to the two cathodes, an alternating current may be generated and confined within said closed circuit without entering the direct current circuit. This is readily accomplished by connecting the wire 70 to the electrical center of a secondary coil 74 of a transformer to which coil the wires 68 and 69 are connected. Suitable means are provided for varying the alternating current produced in the closed circuit, as for example, by the provision of a variable voltage A. C. generator 75 connected to the primary 76 of the transformer. With no current flowing in the transformer, direct current alone will flow through the cell. By increasing the ratio of the effective alternating to the direct current, such that the ratio is .707 to 1, the direct current will be just neutralized at the peak of the opposing wave in the alternating current. As the ratio increases above that value the opposing wave becomes more and more effective as reverse current through each cathode alternately.

The potentiometer may be used to measure the current at any instant in precisely the same manner as described for the substantially instantaneous values of potential of the electrode. For this purpose a calibrated resistance or shunt 77 is placed in the circuit 69 so that the potential across its terminals 78 and 79 is proportional to the current flowing therethrough. The terminal 79 serves likewise as the connection to the electrode D which with the wire 33 from the reference electrode 32 leads to the potentiometer 31. A switch 80 is used to throw the potentiometer circuit to measure either the current or the electrode potential. A second switch 81 is placed in the potentiometer circuit to reverse the polarity as the same may change in successive measurements. Wires 82 and 83 lead from the shunt 77 to the current side of switch 80. Wire 82 from the electrode D and wire 33 from the reference electrode 32 lead to the potential side of the switch 80. The wire 84 leads from one central pole of switch 80 to the contacting device 28 from which wire 30 leads to the reversing switch 81. The wire 85 completes the connections from switch 80 to 81, whence the wires 86 and 87 lead to the potentiometer system 31.

Whereas in the prior case of interrupted direct current, the contacting device was operated by the cycle producer, it is likewise necessary in this case that the contacting device be operated synchronously with the cycle producer of the alternating current. Where it is not convenient to have it mechanically associated with the generator 75, it may be operated by a synchronous motor connected to the same source. In Fig. 9 there is shown the synchronous motor armature 88 which is connected by wires 89 to the same A. C. line as is the transformer primary 76. The field 90 of the motor may be connected by wires 91 to any suitable direct current source, as for example, the same source as that used for the direct current of the cell. Any suitable means may be provided for bringing the synchronous motor up to the synchronous speed, such means being common, and forming no part of this invention.

The operation and control of the foregoing system may be effected by variation of the time of the cycle by varying the speed of the generator 75 and by variation of the alternating and the direct currents in accordance with the requirements determined through the measuring means. In the present instance there is contemplated continuously flowing currents, whereas there has been above described a method for measuring potential when no current is flowing, as in the idle period. With current flowing when the electrode potential measurement is made, there is included in the measurement an extraneous value caused by the ohmic resistance in the circuit. By throwing the switch 80 to one side the apparent electrode potential may be measured at any point in the cycle. By throwing it to the other side the current flowing at that point in the cycle may be measured. It had been found possible to get the proportionality factor of the extraneous potential to the current. By use of this factor it is a simple matter to determine the extraneous potential and deduct it from the measured electrode potential to obtain the true electrode potential.

Figure 10:
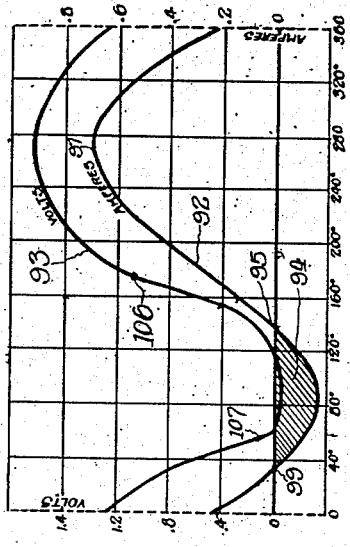
Figs. 10, 11 and 12 shows results produced from the arrangement of Fig. 9.
Figure 11:
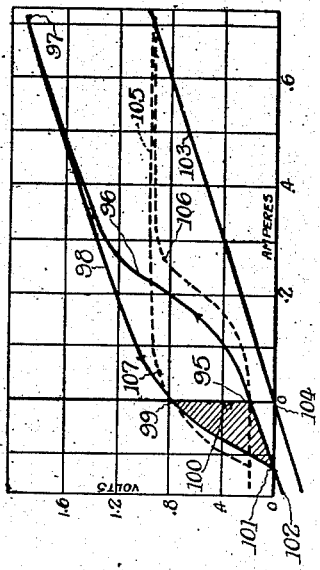
Figure 12:
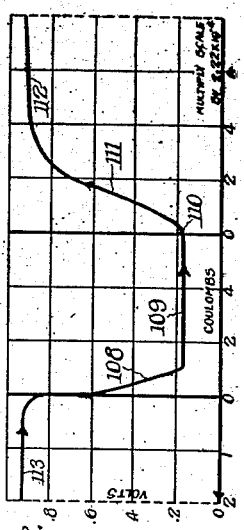

A specific illustration of this is given in Figs. 10, 11 and 12. In Figs. 3 and 9, the electrode D is immersed in normal sulphuric acid solution with no depolarizer present. With the arrangement of Fig. 9 in operation such that an alternating current is superimposed on the direct current flowing through the electrodes A and D, the measuring device is set at various points in the cycle all the way around the same. The ohmic resistance of the shunt 77 may be 1 ohm so that the volts determined by the potentiometer may be read directly as amperes. The reference electrode 32 used in this instance was a hydrogen electrode. The voltage determined by the potentiometer when the switch 80 is thrown to the electrode side is the electrode potential plus the extraneous voltage due to the ohmic resistance. In Fig. 10 curve 92 represents the changing current during the cycle as measured by the potentiometer. Curve 93 represents the changing voltage between the electrode D and the reference electrode 32 throughout the cycle. The area 94 represents that part of the cycle where reverse current flows.

Fig. 11 shows in heavy lines a cyclic curve obtained by plotting against each other the simultaneous values of curves 92 and 93. Beginning with the point 95 the upwardly directed portion of the curve 96 represents positively increasing cathodic current through electrode D. The current rises to a maximum value in the cycle to the point 97 whereafter current decreases downwardly along curve 98, reaching zero at point 99 and then reversing to form the area 100 on return to the starting point 95. The potential measured rises and falls with the changing current. The curve 98 in descending reaches the point 101, thence moves to point 102 and then back to point 95 forming a straight line in which lie the points 101, 102 and 95. Said line is substantially parallel with the upper parts of the curves 96 and 98. It is evident that on these straight lines the voltage is directly proportional to the current flowing, thereby giving the proportionality factor represented by the straight line 103 parallel to the other straight lines and passing through the origin 104. For each value of current the ordinate of the line 103 may be deducted from the ordinates of the cyclic curve in heavy lines. The corrected values so obtained are the true electrode potentials throughout the cycle. They are shown corrected by the dotted cyclic curve. An inspection of the dotted curve shows that the potential rises from a value at the point 95 to a practically constant value along part 105 for a considerable portion of the cycle, namely from point 106 to point 107. The point 107 has been originally located in the dotted curve of Fig. 11 and then transferred to Fig. 10, in order to indicate its proper time position in the cycle. Slight displacement from its true position is apparent due to experimental error. The displacement lies within 10° of the cycle, the duration of contact on the device 28. From the point 95 to 106 (Fig. 10) is about 12% of the total time of the cycle. During this portion the undesired maximum polarizing potential has been eliminated. The products therefore were discharged by the current at a lower potential than elsewhere in the cycle during the positive flow of the current. It appears that at the point 106 the electrode has its storage capacity effectively satisfied in some manner, so that thereafter the usual conditions of direct current electrolysis prevail until the the current is reversed.

The capacity of reverse current to remove the storage is directly proportional to the quantity of electricity flowing, or, electrically speaking, to the coulombs. By the principles of well known electrical mathematics the shaded area 94 of Fig. 10 represents the coulombs of reverse current. The true potential as determined by the dotted curve of Fig. 11 has been plotted in Fig. 12 against the coulombs of reverse current determined, practically, by approximation or planimetric measurement of the area of portions of 94 in Fig. 10. The curve is shown in two parts 108 and 109. Part 108 shows the period in which the fall takes place from the maximum value of 105 (Fig. 11) to a practically constant value along portion 109, during the existence of which value the stored energy is being removed. At the point 110 the reverse current becomes changed again and storage recommences along curve 111 till it becomes constant along part 112 corresponding to part 105 of Fig. 11. The parts 111 and 112 are likewise plotted against coulombs, but, in this instance, of positive current measured from the starting point (95 in Figs. 10 and 11). The coulombs prior to reversal are plotted to indicate that direction and the curve 113 indicates the potential at this time. As coulombs increase along curve 112 the same merges into curve 113 representing the electrode potential cycle, a considerable portion of which is left off in Fig. 12.

Figure 13:
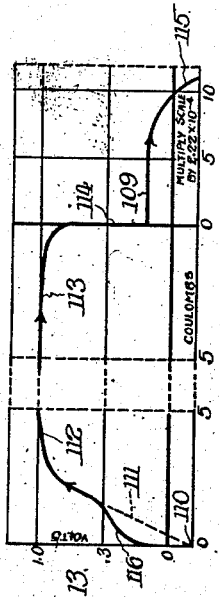
Fig. 13 shows results obtained when a functional change of the electrode takes place.

In Fig. 12 if the reverse coulombs were allowed to add up before another reversal (point 110) the stored energy will be totally removed and the electrode will become an anode. This is the change in functional character already alluded to in the foregoing part of this description. In Fig. 13 I show a plot derived in the same manner as Fig. 12, under the same conditions using merely an alternating current between electrodes A and D. Some reference numerals in Fig. 13 are identical with those in Fig. 12, and they correspond to similar conditions in so far as they are identical. The point of reversal 110 begins the rising part of the curve 111 to the constant value 112 which becomes 113 prior to reversal. At reversal on line 114 it reaches the practically constant value along the curve 109 during which the storage is removed. In this instance the reverse coulombs continue, the stored energy is all removed, and the electrode potential drops along curve 115 and the electrode D becomes an anode, or changes its functional character.

Referring to the functional character, it is ordinarily understood that a cathodic electrode is one having a current flowing to it from the solution. Likewise, the anodic electrode is commonly understood to be one from which current flows to the solution. In discussing the functions of electrodes as used in this invention, the above terms are not strictly apt, since an electrode is here considered functionally as cathode while current flows from it to the solution. In making the change of functional character, I have shown the true cathodic activity (Fig. 13) at 113, the anodic activity along 115 extended, and an intermediate state of activity 109, in which the electrode is strictly neither cathode nor anode in the common sense. This situation may likewise be true for the anode as well as for the cathode. To such states I have ascribed respectively the terms anathodic and cathanodic.

The new electrode types are herein defined from two aspects, one, direction of current, and two, polarization.

An anathode is an electrode receiving current as a cathode, which current is removing the stored energy produced by its prior functioning as an anode.

An anathode is an anodically polarized electrode conducting a depolarizing current and is in unstable equilibrium, shifting from one extreme as an anode toward the other extreme as a cathode.

A cathanode is an electrode receiving current as an anode, which current is removing energy produced by its prior functioning as a cathode.

A cathanode is a cathodically polarized electrode conducting a depolarizing current and is in unstable equilibrium, shifting from one extreme as a cathode toward the other extreme as an anode.

In accordance with the above definitions, the so-called positive plate of a lead storage cell is an anode during the charging operation, and is an anathode during the discharge.

Referring again to Fig. 13 the line 111 is shown in two parts. The actually measured curve did not include the dotted portion of line 111, but ran along the heavy portion 116. This is caused by complications arising from passing through the cathanodic state, to the anodic, and thence through the anathodic to the cathodic states. During the anathodic state corrosion of the lead to lead sulphate takes place. In those circumstances where such a corrosion is desired it is possible to apply this invention to produce it where it would not ordinarily occur. And it may likewise be so applied as to avoid its accidental occurrence in the otherwise blind application of cyclic currents.

In the foregoing a depolarizer has not been mentioned where reverse current has been used. Referring to Fig. 12, if a depolarizer were present, the liberated products would be distributed between the capacity of the depolarizer for absorption and the electrode for storage. Consequently the rise of curve 111 to its maximum would be delayed and the products in the meantime would be discharged at a lower potential over a greater part of the cycle. As already stated this is the desired object of this use of the invention.

Figure 14:
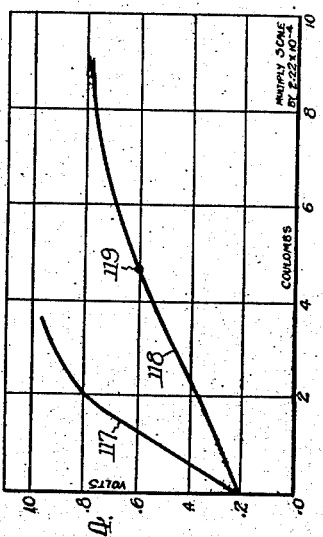
Fig. 14 shows the effect produced by a depolarizer on the rise of the electrode potential.

In Fig. 14 curve 117 shows a composite of a number of curves corresponding to the curves 111 and 112 produced in the absence of depolarizers. Curve 118 shows a composite of a number of curves produced with various depolarizers. The original curves from which the composite curves 117 and 118 have been derived were produced under conditions varying in time and current density, to such an extent that mutual comparisons would be quite impossible. When compared on the coulomb scale they fall into two general types as represented by the composite curves 117 and 118. They show that in the presence of a depolarizer a prolonged period of lower potential exists for the electrode during which the products discharged may be absorbed at a potential below the maximum polarizing potential of a continuous direct current. During this period the electrode seeks to arrive at the maximum potential as evidenced by the upward tendency of the curve 118. By removing the accumulating energy this may be prevented. It is evident from the foregoing that this may be accomplished by a period of idleness for the electrode or by a period of reverse current. By means of the device 28 the prevailing conditions may be determined and the variables in the electric circuit so controlled as to secure the desired results, chiefly, to break the current before the electrode attains any predetermined maximum value.

Referring to Fig. 14, assume that at the point 119 in curve 118, the maximum desired potential has been attained. Assume that some undesired product is formed above this potential and not below it. Therefore it is possible to keep this product from forming by reversing the current before or at reaching the point 119.

In practice, the control in doing this is not so complicated as the procedure just set forth in deriving the illustrative curves. Such procedure has been given to explain the full possibilities of the invention, and to illustrate the manner of correcting measurements made during the flow of current. Referring to Fig. 10, it is seen that there are two points 95 and 99 where the current is zero. By setting the potentiometer to measure a zero value the device 28 may be set at the point in the cycle where the current is zero. Two such locations will be found corresponding to the points 95 and 99. By throwing the switch 80 to the potential side, the electrode potential may be measured directly without any extraneous potential being included, since none exists. By following the potentials at these points and regulating the controls for the time of the cycle, and the current densities, the course of the electrode potential throughout the cycle may be made to fall within prescribed limits.

Figure 15:
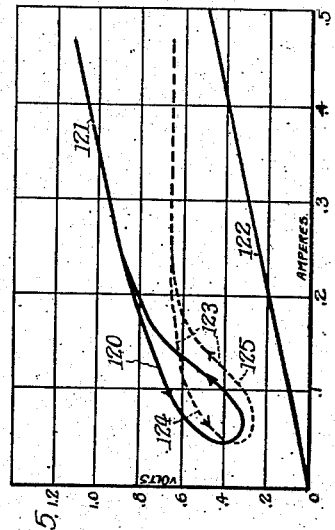
Fig. 15 shows the effect of a sinusoidal asymmetric direct current.

In the foregoing I have set forth in detail the methods of hastening the depolarization by the flow of reverse current, and the method of self depolarization by a period of idleness, but have not set forth any method for slowing down the self depolarization. It is obvious, now that the principles of the method have been set forth, that the flow of a minimum amount of current will replenish to some extent the energy lost by the natural dissipation. This is best exemplified in a cell containing a depolarizer. In this case the products discharged are distributed between the depolarizer, for absorption thereby, and the electrode, for storage thereby. When the current is lessened the capacity of the depolarizer may draw from the storage, and thereby gradually reduce the potential of the electrode. Fig. 15 is shown to illustrate a case of this kind. A combined alternating current and direct current was used in which the alternating current was not great enough to form a reverse current, resulting in a sinusoidal direct current. Curve 120 corresponds to the heavy cyclic curve of Fig. 11 in which the simultaneous values of current and potential are plotted. The linear portion 121 of the curve gives the correction for the extraneous value measured as represented by the line 122. Correcting curve 120, as heretofore set forth by deducting the curve 122 therefrom, the true electrode potential is represented by the dotted curve 123 having a looped portion. In this portion the upper part 124 is formed on decrease of the current from the maximum value, and lower part 125 on increase from the minimum value. The loop effect shows that on decreasing the current, part of the energy remained stored, and that while the lesser current flowed the depolarizer drew upon the storage. This phenomenon may be compared to that of hysteresis in electromagnetism.

In practicing the invention it is to be understood that the same is not limited to making potential measurements and tests upon each electrode being utilized, and at each instance of operation. It will of course be understood by those skilled in the art that duplication of apparatus and conditions according to a control is also contemplated. Also the determination of a working procedure by means of applying the invention and the subsequent design and control of apparatus, according to the procedure developed in the manner of a competent engineer or operator, are equally considered to be within the scope of the invention as expressed in the appended claims. These conditions are herein disclosed by that part of the foregoing description relating to the electrode A (Figs. 5 and 9) which is described as duplicating the electrode D which has been chosen as the control electrode.

It is obvious that this invention may be applied in a variety of ways in electrolytic work without any departure from the principles herein set forth. And it is not necessary that an electrolytic cell with a solution therein be the conducting medium between the electrodes. In the appended claims I aim to set forth the invention in its broadest aspect in whatever fields one seeks to employ it.

I claim as my invention:

1. The method of current application to a conducting medium through an electrode, which comprises passing in repeating cycles a non-constant current through an electrode and a conducting medium, controlling the current strength and the time of action to effect a desired relation between the electrode and the medium, and passing a corresponding non-constant current at the same density through an electrode of similar electrode material and a similar medium to duplicate the condition of the first electrode.

2. The method of current application to a conducting medium through an electrode, which comprises passing in repeating cycles a non-constant current through an electrode and a conducting medium, ascertaining the effect of current strength and time of action at any part of the cycle, subsequently passing a similar type of non-constant current in repeating cycles through a similar electrode and a similar medium at the same current density, and controlling said last mentioned non-constant current in accordance with the ascertained results.

3. A system for using current comprising, in combination, a conducting medium, an electrode in said medium, means to supply continuous current through said electrode, other electrodes in said medium, means to produce a cyclic current through each of said other electrodes, said means in combination with said other electrodes being an electrode system permitting the flow of continuous current through the first electrode, and measuring means associated with said system to determine electrical values at any point in the cycle.

4. A system for using current comprising, in combination, a conducting medium, an electrode system in said medium, means to supply continuous current through said electrode system, other electrodes in said medium, means to produce a cyclic current through each of said other electrodes, said means permitting the flow of continuous current from the first electrode system through some one of said other electrodes, and a measuring device for determining the effect of said currents within any part of the cycle.

5. A system for using current comprising, in combination, a conducting medium, an electrode in said medium, means to supply continuous current through said electrode, other electrodes in said medium, means to produce in each of said other electrodes repeating cycles of current passing pulsatingly in said other electrodes in the direction of flow of the first mentioned current through said first electrode, said last mentioned means permitting the flow of continuous current through said first electrode, and means to measure the effect of such currents within any part of the cycle.

6. A system for using current comprising, in combination, a conducting medium, an electrode system in said medium, means to supply continuous current through said electrode system, other electrodes in said medium, means to produce in each of said other electrodes repeating cycles of current passing pulsatingly in said other electrodes in the direction of flow of the first mentioned current through said first electrode system, said last mentioned means permitting the flow of continuous current through said first electrode system, and a measuring device synchronously related to said cycle producing means.

7. A system for using current comprising, in combination, a conducting medium, three electrode systems therein, the first system being adapted to carry a continuous current between said system and the medium, means to produce in the other two systems current in repeating cycles, each of said cycles including an active period during which the current through the first system passes through one of said other systems, and means to determine the effect of the current at any part of the cycle.

8. A system for using current comprising, in combination, a conducting medium, an electrode system therein, means to supply continuous current through said system, two electrodes in said medium connected respectively to the terminals of a alternating current generator, a connection from the electrical center of said generator to the continuous current supplying means, whereby said two electrodes are electrically equivalent.

9. A system for using current transmission, comprising, in combination, a conducting medium, an electrode system therein, means to supply continuous current through said system, one terminal of said means being connected to the electrode system, two electrodes in said medium connected respectively to the terminals of an alternating current generator, a connection from the electrical center of said generator to the other terminal of the continuous current supplying means, whereby said two electrodes are electrically equivalent, and means to vary the strength ratio of the alternating and the direct currents.

10. A system for using current transmission, comprising, in combination, a conducting medium, an electrode system therein, means to supply continuous current through said system, one terminal of said means being connected to the electrode system, two electrodes in said medium connected respectively to the terminals of an alternating current generator, a connection from the electrical center of said generator to the other terminal of the continuous current supplying means, whereby said two electrodes are electrically equivalent, means to vary the strength ratio between the alternating and the direct currents, and measuring means synchronously related to said generator for determining within the cycles of the system various electrical values for the purpose of control.

11. In electric current transmission through a conducting medium having an electrode therein, the method of passing repeating cycles of current through said electrode, one part of said cycle being a characteristically functioning current, and measuring the electrode potential between said medium and said electrode at any part of the cycle.

12. In electric current transmission through a conducting medium having an electrode therein, the method of passing repeating cycles of current through said electrode, one part of said cycle being a characteristically functioning current, and another part of said cycle being relatively reverse current, and measuring the electrode potential between said medium and said electrode at any part of the cycle.

13. The method of passing current between an electrode and a conducting medium, comprising, passing in repeating cycles intermittent positive pulses of current, passing alternate negative pulses of current, and measuring the electrode potential at any part of the cycle.

14. The method of passing current between an electrode and a conducting medium, comprising, passing in repeating cycles intermittent positive pulses of current, passing alternate negative pulses of current, and measuring the electrode potential in the cycle at any point of zero current.

15. The method of control for current between an electrode and a conducting medium, comprising, passing in repeating cycles intermittent positive pulses of current, passing alternate negative pulses of current, measuring the electrode potential in the cycle at any point of zero current, and controlling the current values and the time of action of the current to effect a predetermined value at said point of measurement.

16. In electrolysis, the method of passing through an electrode cyclic reversing current whereby to produce alternately one of the two characteristic electrode functions and the ensuing stage which approaches the other characteristic function, and determining the extent of said functioning for the purpose of control.

17. In electrolysis, the method of passing through an electrode cyclic current, and measuring the electrical values in any part of the cycle for the purpose of predetermined control.

18. A method of electrolysis comprising the steps of passing through an electrode an electric current in a sequence of repeating cycles, each of said cycles having one portion in which current flows in one direction, and having another portion in which the current flows in the other direction, determining the potential of the electrode at various points in the cycle, and controlling the quantity of electricity in the periods of the cycle to prevent a change in the functional character of the electrode.

19. A method of electrolysis comprising passing through an electrode a sequence of repeating cycles of current, the current during the major portion of the cycle causing the electrode to have one characteristic function, the current during the remainder of the cycle being opposed in polarity to the current during the first portion of the cycle, determining the functional character of the electrode, and controlling the current and the periods of the cycle to prevent a change in functional character of the electrode by the effect of the opposing current.

20. A method of conducting electrolysis which comprises passing a non-constant current through an electrode, said current having values repeating in similar cycles, and controlling the values of said current and the period of the cycle to effect a predetermined control over the electrical potential at any part of the cycle.

21. A method of conducting electrolysis which comprises passing a non-constant current through an electrode, said current having values repeating in similar cycles, said values including zero values, and controlling the values of said current, the duration of said values, and the period of the cycle to effect a predetermined control over the electrode potential.

22. A method of conducting electrolysis which comprises passing a non-constant current through an electrode, said current having values repeating in similar cycles, said values including zero values and relatively positive and negative values, and controlling the values, the period of the cycle, and the duration of said zero, positive, and negative values to effect a predetermined control over the electrode potential.

23. A method of controlling electrolysis comprising passing in repeating cycles a non-constant current of varying values including zero values, and controlling the period of the cycle, the values of the current, and the time of action of the current at the different values whereby to effect a predetermined control over the electrode potential.

24. A method of controlling electrolysis comprising passing in repeating cycles a non-constant current of varying values including zero values and relatively positive and negative values, and controlling the period of the cycle, the values of the current and the time of action of the current of the different types of values whereby to effect a predetermined control over the electrode potential.

25. A method of controlling electrolysis of a conducting medium containing a depolarizer, comprising passing in repeating cycles a non-constant current of varying values including zero values, and controlling the period of the cycle, the values of the current, and the time of action of the current at the different values whereby to effect a predetermined control over the electrode potential as the potential is affected by the depolarizer.

26. A method of controlling electrolysis of a conducting medium containing a depolarizer, comprising passing in repeating cycles a non-constant current of varying values including zero values and relatively positive and negative values, and controlling the period of the cycle, the values of the current, and the time of action of the current of the different types of values whereby to effect a predetermined control over the electrode potential as the potential is affected by the depolarizer.

27. A method of passing current between an electrode and a conducting medium containing a depolarizer comprising passing in repeating cycles intermittent positive pulses of current, passing alternate negative pulses of current, measuring the electrode potential at any part of the cycle, and controlling the current values and the time of passage of the pulses of current whereby to hold the electrochemical action of the electrode on the depolarizer within desired limits.

28. A method of passing current between an electrode and a conducting medium containing a depolarizer comprising passing in repeating cycles intermittent positive pulses of current, passing alternate negative pulses of current, measuring the electrode potential in the cycle at any point of zero current, and controlling the current values and the time of passage of the pulses of current whereby to hold the electrochemical action of the electrode on the depolarizer within desired limits.

29. A method of control for current between an electrode and a conducting medium containing a depolarizer comprising passing in repeating cycles intermittent positive pulses of current, measuring the electrode potential in the cycle at any point of zero current, and controlling the current values and the time of action of the pulses of current to effect a predetermined value of the electrode potential at said point of measurement whereby to control the electrochemical action of the depolarizer.

30. In electrolysis in a medium containing a depolarizer, the method of passing through an electrode cyclic, reversing current whereby to produce alternately one of the two characteristic electrode functions and the ensuing stage which approaches the other characteristic function, and determining the extent of said functioning whereby to control the electrochemical action of the depolarizer at predetermined limits of the electrode potential.

31. In electrolysis, the method of passing through an electrode acting on a depolarizer a cyclic current, and measuring the electrical values in any part of the cycle for the purpose of controlling the electrochemical reaction of the depolarizer between predetermined electrode potentials.

32. A method of electrolysis in a conducting medium containing a depolarizer comprising the steps of passing through an electrode an electric current in a sequence of repeating cycles, each of said cycles having one portion in which current flows in one direction and having another portion in which the current flows in the other direction, determining the potential of the electrode at various points in the cycle, and controlling the quantity of electricity in the periods of the cycle to prevent a change in the functional character of the electrode effected in part by the depolarizer and the current.

33. A method of electrolysis in a medium containing a depolarizer comprising passing through an electrode in sequence repeating cycles of current, the current during the major portion of the cycle causing the electrode to have one characteristic function, the current during the remainder of the cycle being opposed in polarity to the current during the first portion of the cycle, determining the functional character of the electrode, and controlling the current, the period of the cycle, and the duration of the different portions of the cycle, to prevent a change in the functional character of the electrode by the effect of the opposing current acting in combination with the depolarizer on said electrode.

34. A method of electrical transmission comprising passing a continuous flow of uni-directional current within an electrode system in a conducting medium containing a depolarizer, conducting said current through a plurality of other electrodes in said medium with an intermittent flow of said current in each of said other electrodes, and controlling the intermittent flow in accordance with predetermined conditions determined in part by the character of the depolarizer.

35. A method of electrolysis comprising passing successive impulses of uni-directional electricity through an electrode of an electrocyclic cell containing a depolarizer, the quantity of electricity passing at each impulse being insufficient to raise the electrode to its maximum polarized potential, the time interval between impulses being sufficient to permit the depolarizer to partially destroy the electrochemical effects of the previous impulses, measuring said effects, and controlling the current to maintain predetermined conditions.

36. A system for using current transmission comprising, in combination, a conducting medium containing a depolarizer, an electrode in said medium, means to supply continuous current through said electrode, other electrodes in said medium, means to produce a cyclic current through each of said other electrodes, said means in combination with said other electrodes being an electrode system permitting the flow of continuous current through the first electrode, and measuring means associated with said system to determine electrical values at any point in the cycle.

37. A system for using current transmission comprising, in combination, a conducting medium containing a depolarizer, an electrode system in said medium, means to supply continuous current through said electrode system, other electrodes in said medium, means to produce a cyclic current through each of said other electrodes, said means permitting the flow of continuous current from the first electrode system through some one of said other electrodes, and a measuring device for determining the effect of said currents within the cycle.

38. A system for using current transmission comprising, in combination, a conducting medium, containing a depolarizer, an electrode in said medium, means to supply continuous current through said electrode, other electrodes in said medium, means to produce in each of said other electrodes repeating cycles of current passing pulsatingly in said other electrodes in the direction of flow of the first mentioned current through said first electrode, said last mentioned means permitting the flow of continuous current through said first electrode, and means to measure the effect of such currents within any part of the cycle.

39. A system for using current transmission comprising, in combination, a conducting medium containing a depolarizer, an electrode system in said medium, means to supply continuous current through said electrode system, other electrodes in said medium, means to produce in each of said other electrodes repeating cycles of current passing pulsatingly in said other electrodes in the direction of flow of the first mentioned current through said first electrode system, said last mentioned means permitting the flow of continuous current through said first electrode system, and a measuring device synchronously related to said cycle producing means.

40. A system for using electric current comprising, in combination, a conducting medium containing a depolarizer, three electrode systems therein, the first system being adapted to carry a continuous current between said system and the medium, means to produce in the other two systems current in repeating cycles, each of said cycles including an active period during which the current through the first system passes through one of said other systems, and means to determine the effect of the current at any part of the cycle.

41. A system for using current transmission, comprising, in combination, a conducting medium containing a depolarizer, an electrode system therein, means to supply continuous current through said system, two electrodes in said medium connected respectively to the terminals of an alternating current generator, a connection from the electrical center of said generator to the continuous current supplying means, whereby said two electrodes are electrically equivalent.

42. A system for using current transmission, comprising, in combination, a conducting medium containing a depolarizer, an electrode system therein, means to supply continuous current through said system, one terminal of said means being connected to the electrode system, two electrodes in said medium connected respectively to the terminals of an alternating current generator, a connection from the electrical center of said generator to the other terminal of the continuous current supplying means, whereby said two electrodes are electrically equivalent, and means to vary the strength ratio of the alternating and the direct currents.

43. A system for using current transmission, comprising, in combination, a conducting medium containing a depolarizer, an electrode system therein, means to supply continuous current through said system, one terminal of said means being connected to the electrode system, two electrodes in said medium connected respectively to the terminals of an alternating current generator, a connection from the electrical center of said generator to the other terminal of the continuous current supplying means, whereby said two electrodes are electrically equivalent, means to vary the strength ratio between the alternating and the direct currents, and measuring means synchronously related to said generator for determining within the cycles of the system various electrical values for the purpose of control.

44. In electric current transmission through a conducting medium having an electrode therein, said medium containing a depolarizer, the method of passing repeating cycles of current through said electrode, one part of said cycle being a characteristically functioning current, and measuring the electrode potential between said medium and said electrode at any part of the cycle to control the electrochemical action of the electrode and the depolarizer.

45. In electric current transmission through a conducting medium having an electrode therein, said medium containing a depolarizer, the method of passing repeating cycles of current through said electrode, one part of said cycle being positively functioning current, and another part of said cycle being relatively reverse current, and measuring the electrode potential between said medium and said electrode at any part of the cycle to control the electrochemical action of the electrode and the depolarizer.

46. In an electrical circuit, a local circuit having in series an alternating current generator, an electrode, a conducting medium and a second electrode, said local circuit being connected into the given circuit on one side by an electrode in the conducting medium and on the other side at a point which is the electrical center of the alternating current generator.

47. In combination a conducting medium, a group of more than two electrodes in said medium, means to supply current to said medium through at least two of said electrodes in such a manner that the medium is constantly conducting current, means associated with some two of said electrodes to vary the current through them in repeating cycles, and means to determine the effects of current passage through the medium at any point in the cycle.

48. In electrolysis, the method of passing through an electrode a controlled cyclic current which reverses within the cycle whereby to produce alternately one of the two characteristic electrode functions and the ensuing intermediate stage which approaches the other characteristic function.

49. The method of electrolysis in a medium containing a depolarizer which comprises passing through an electrode immersed in said medium a controlled cyclic reversing current whereby to produce alternately one of the two characteristic electrode functions and the ensuing intermediate stage which approaches the other characteristic function.

50. The method of electrolysis which comprises passing a controlled cyclic current through an electrode and a conducting medium, whereby to produce between the electrode and the medium a potential which is controlled by the current between predetermined limits within the anodic and cathodic extremes of potential.

51. In an electrical circuit, a local circuit having in series an induction coil, an electrode, a conducting medium and a second electrode, said local circuit being connected into the given circuit on one side by an electrode in the conducting medium and on the other side at a point which is the electrical center of the induction coil.

In testimony whereof, I have hereunto affixed my signature.

W. BARTLETT JONES.